(12) United States Patent
Yamazaki et al.

(10) Patent No.: US 8,345,149 B2
(45) Date of Patent: Jan. 1, 2013

(54) IMAGING APPARATUS FOR READING INFORMATION

(75) Inventors: Kozo Yamazaki, Inagi (JP); Isao Iwaguchi, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 615 days.

(21) Appl. No.: 12/561,870

(22) Filed: Sep. 17, 2009

(65) Prior Publication Data

US 2010/0079657 A1    Apr. 1, 2010

(30) Foreign Application Priority Data

Sep. 30, 2008    (JP) ................ 2008-254848

(51) Int. Cl.
*H04N 5/225* (2006.01)
*H04N 5/232* (2006.01)
*G03B 7/00* (2006.01)

(52) U.S. Cl. .............. 348/360; 348/345; 396/241
(58) Field of Classification Search ........... 348/345, 348/342, 360, 363, 369; 396/241, 79–83
See application file for complete search history.

(56) References Cited

U.S. PATENT DOCUMENTS

| | | | |
|---|---|---|---|
| 5,111,343 A | 5/1992 | Harrigan | |
| 5,541,779 A * | 7/1996 | Choi ................ | 359/885 |
| 6,587,148 B1 | 7/2003 | Takeda et al. | |
| 7,099,555 B2 | 8/2006 | Onuki et al. | |
| 2007/0216796 A1 * | 9/2007 | Lenel et al. .......... | 348/345 |

FOREIGN PATENT DOCUMENTS

| | | |
|---|---|---|
| CN | 1116720 A | 2/1996 |
| EP | 1 607 771 | 12/2005 |
| JP | 09-083858 | 3/1997 |
| JP | A 2003-50991 | 2/2003 |
| JP | 2005-266096 | 9/2005 |
| JP | 2006-030602 | 2/2006 |
| JP | 2007-140176 | 6/2007 |
| WO | WO 2005/093471 | 10/2005 |

OTHER PUBLICATIONS

Extened European Search Report, mailed May 18, 2010, and issued in co-pending European Patent Application No. 09 17 0608.
Chinese Office Action issued in corresponding Chinese App. No. 200910177592.3, issued May 12, 2011.
Notice of Rejection Ground dated Jan. 27, 2012 from corresponding Japanese Patent Application No. 2008-254848 (with English translation).

* cited by examiner

*Primary Examiner* — Aung S Moe
*Assistant Examiner* — Mekonnen Dagnew
(74) *Attorney, Agent, or Firm* — Greer, Burns & Crain, Ltd.

(57) ABSTRACT

The optical path of the light having spread at each point of an object to be shot is limited by an iris unit of a density filter. Since the density filter unit has a desired transmittance characteristic, the amount of the light passing through the density filter unit continuously changes from the center of the luminous flux toward the periphery. After the luminous flux forms an image on the image forming surface, it spreads toward the light-receptive surface of an image sensor, and becomes an image spreading on the light-receptive surface in a predetermined range.

5 Claims, 16 Drawing Sheets

|     | a-2 | a-1   | a     | a+1   | a+2 |
|-----|-----|-------|-------|-------|-----|
| b+2 | 0   | 0     | 0     | 0     | 0   |
| b+1 | 0   | 0.063 | 0.125 | 0.063 | 0   |
| b   | 0   | 0.125 | 0.25  | 0.125 | 0   |
| b-1 | 0   | 0.063 | 0.125 | 0.063 | 0   |
| b-2 | 0   | 0     | 0     | 0     | 0   |

Q(a,b) = 0.063*P(a-1, b+1) +0.125*P(a, b+1) +0.063*P(a+1, b+1)
+0.125*P(a-1, b) +0.25*P(a, b) +0.125*P(a+1, b)
+0.063*P(a-1, b-1) +0.125*P(a, b-1) +0.063*P(a+1, b-1)
WHERE P INDICATES VALUE OF OBTAINED IMAGE, AND Q
INDICATES OUTPUT AFTER OPERATION

F I G. 6 A

|     | a-2 | a-1   | a     | a+1   | a+2 |
|-----|-----|-------|-------|-------|-----|
| b+2 | 0   | 0     | 0     | 0     | 0   |
| b+1 | 0   | 0.111 | 0.111 | 0.111 | 0   |
| b   | 0   | 0.111 | 0.111 | 0.111 | 0   |
| b-1 | 0   | 0.111 | 0.111 | 0.111 | 0   |
| b-2 | 0   | 0     | 0     | 0     | 0   |

F I G. 6 B

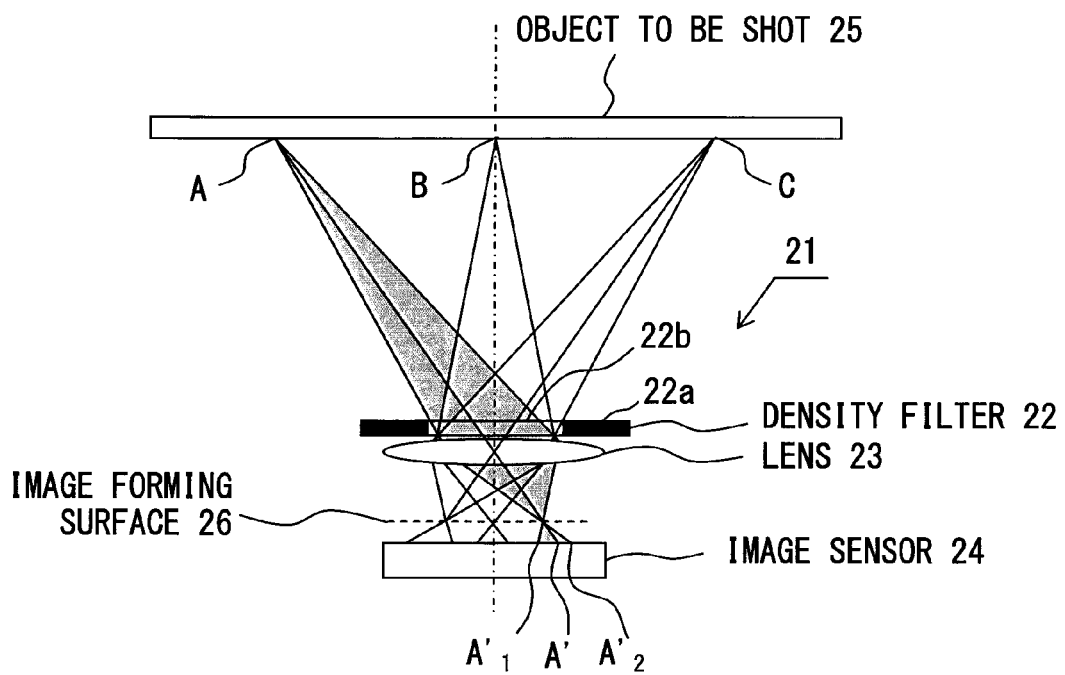
F I G. 7

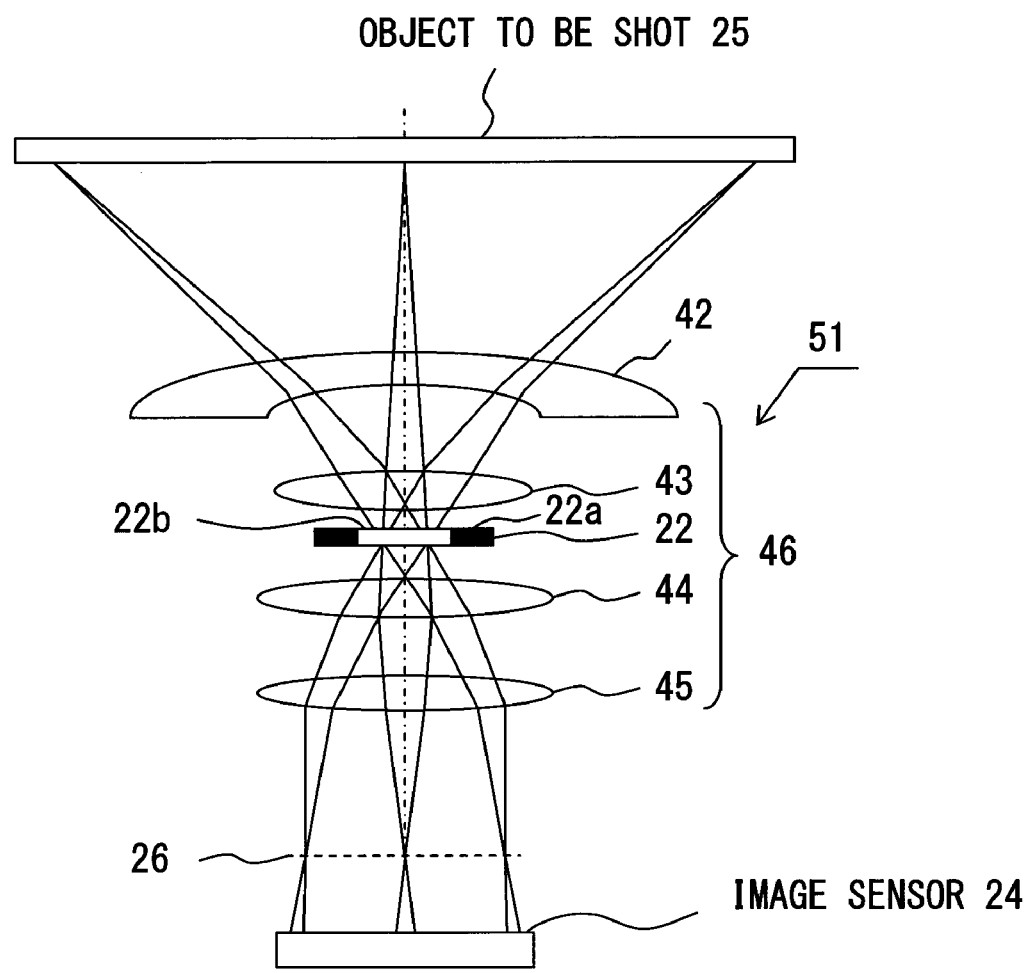
F I G. 9

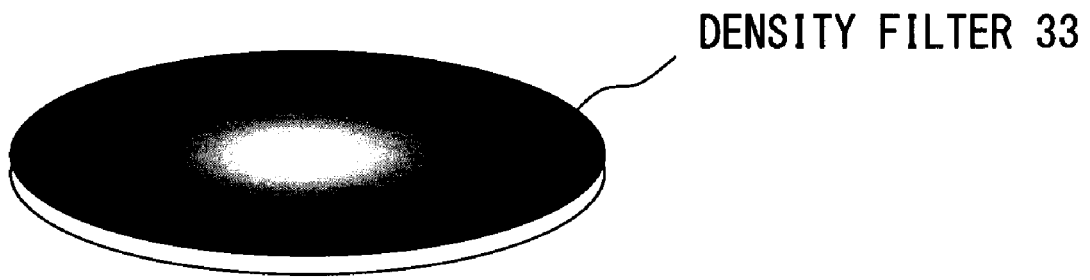
F I G. 1 2

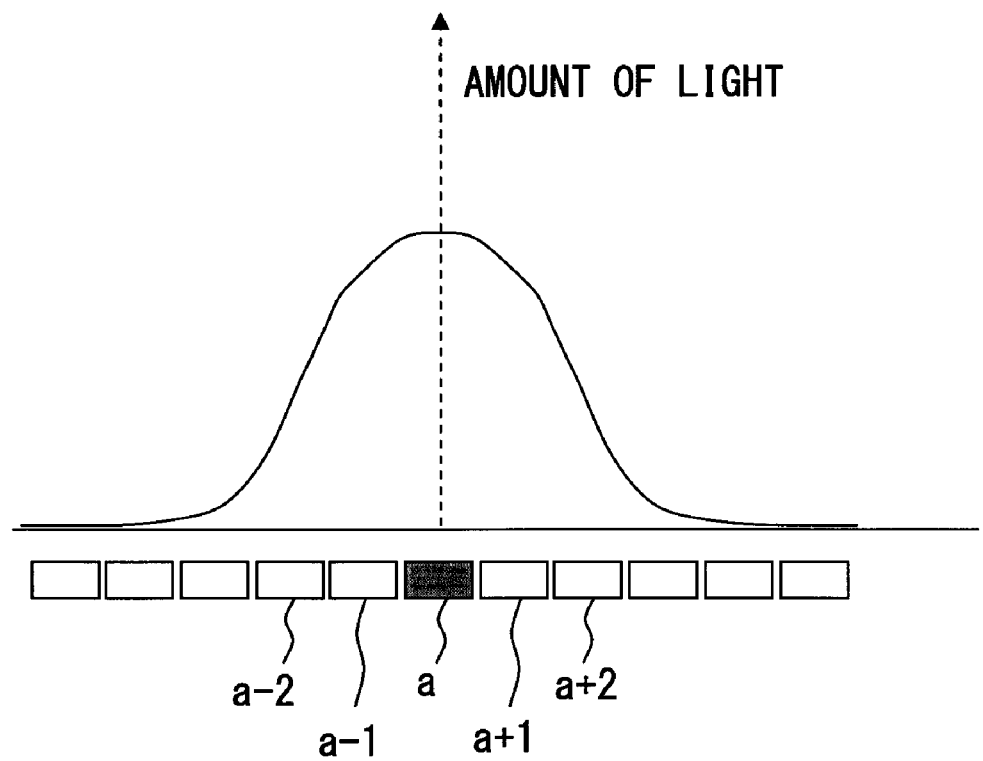
F I G. 13

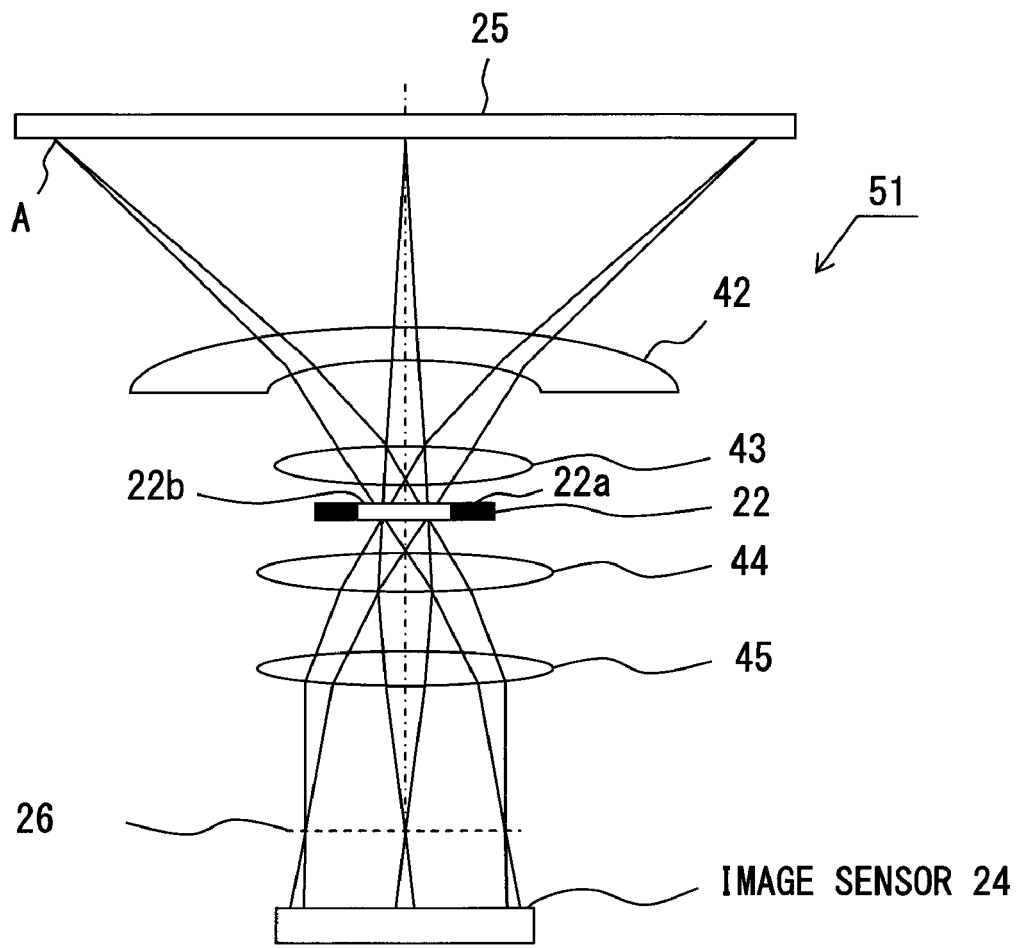
F I G. 1 4 A
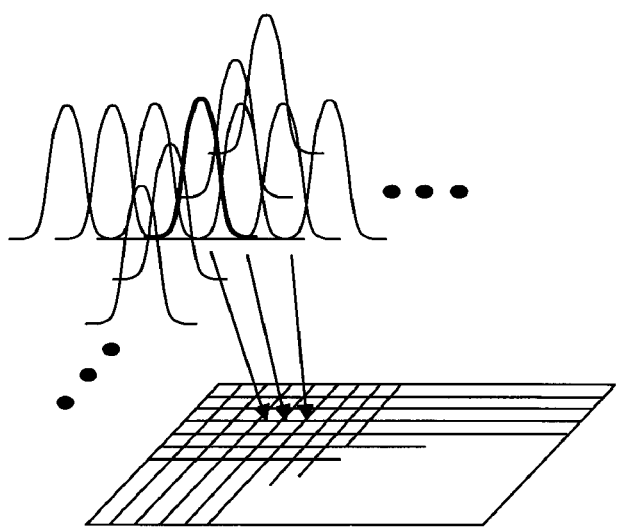
F I G. 1 4 B

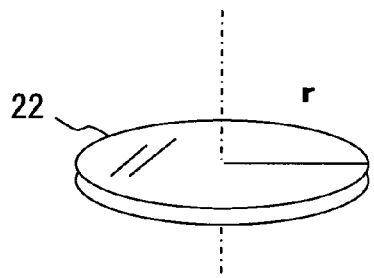
F I G. 16A
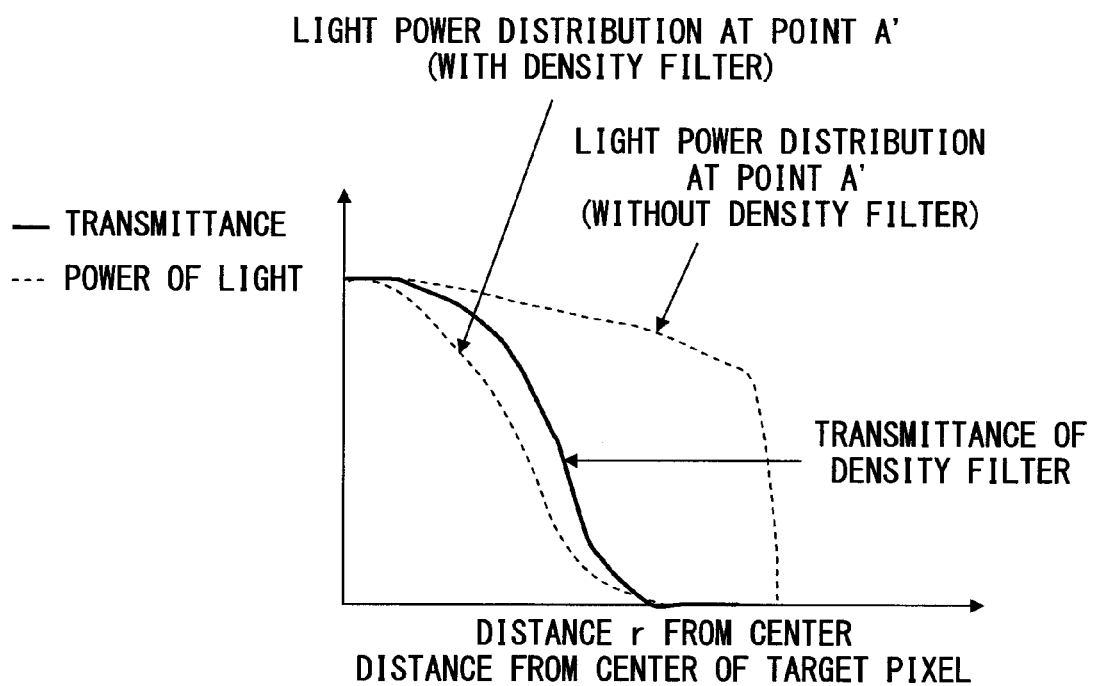
F I G. 16B

IMAGING APPARATUS FOR READING INFORMATION

FIELD OF THE INVENTION

The present invention relates to an imaging apparatus for reading information from an object.

DESCRIPTION OF THE RELATED ART

An imaging apparatus is used to read information printed on a medium such as a paper sheet, or information on a live body. FIGS. 1 and 2 illustrate the configurations of the optical system of an imaging apparatus 11 for reading information, such as a bar code printed on a paper sheet etc.

As illustrated in FIGS. 1 and 2, the imaging apparatus 11 has an iris 12, a lens 13 (or a lens module 16), and an image sensor 14.

The optical path of the light reflected by an object to be shot 15 is limited by the iris 12, and the light is received by the image sensor 14 through the lens 13.

When the information printed on a medium is read by the imaging apparatus 11, the distance between the lens 13 and the image sensor 14 is adjusted, so that the image forming surface is matched to the surface of the image sensor 14, thereby acquiring a clear image.

However, while a clear image has a large information volume, a change of a signal by the coarseness of the surface of the medium is superposed as noise on an original image signal.

FIGS. 3A and 3B are examples of the object to be shot 15. When a pattern printed on a paper sheet etc. as illustrated in FIG. 3A is read by the imaging apparatus 11, a change of a signal by coarseness of the paper surface can get on an original image signal as noise.

When the vein inside the palm of a hand as illustrated in FIG. 3B is read, the scattered light from the organization of the living body around the vein also gets on the original image signal as noise. Therefore, it is necessary to remove noise by performing an operation for low pass filter (LPF) processing etc.

FIG. 4A illustrates an image signal of an arbitrary line (for example, a line A illustrated in FIG. 3A) of an object to be shot, on which the noise is superposed. FIG. 4B illustrates an image signal after the noise is removed by low pass filter (LPF) processing.

FIG. 5 illustrates the output of the image sensor 14 of a conventional imaging apparatus. FIG. 5 illustrates the distribution of a level of an output signal of the point image on the image sensor 14 corresponding to an arbitrary point on an object to be shot, and the image forming surface matches the sensor surface to obtain a clear image. Therefore, the distribution of the level of an output signal indicates a waveform of the substantial concentration on one pixel.

As described above, the clearer an image obtained by the imaging apparatus 11 is, the higher frequency noise gets on an image signal by the coarseness of the surface of a medium.

To solve the problem, conventional techniques perform an operation of low pass filter processing on an image signal output from the image sensor 14 to remove the high frequency noise.

FIGS. 6A and 6B illustrate the operation matrix of a Gaussian filter and a moving average filter used in the low pass filter processing.

The 3×3 operation matrix illustrated in FIG. 6A is described below. The target pixel Q (a, b) is calculated as a sum of a value obtained by multiplying the upper left pixel data P (a−1, b+1) by "0.063", a value obtained by multiplying the upper pixel data P (a, b+1) by "0.125", a value obtained by multiplying the upper right pixel data P (a+1, b+1) by "0.063", a value obtained by multiplying the left adjacent pixel data P (a−1, b) by "0.125", a value obtained by multiplying the pixel data P (a, b) by "0.25", a value obtained by multiplying the right adjacent pixel data P (a+1, b) by "0.125", a value obtained by multiplying the lower left pixel data P (a−1, b−1) by "0.063", a value obtained by multiplying the lower pixel data P (a, b−1) by "0.125", a value obtained by multiplying the lower right pixel data P (a+1, b−1) by "0.063".

An image signal treated by the Gaussian filter processing can be obtained by performing the above-mentioned operation on each pixel.

Similarly, the operation matrix illustrated in FIG. 6B is performed, that is, an image signal treated by the moving average filter processing can be obtained by multiplying a target pixel and its peripheral pixels by the value of the operation matrix illustrated in FIG. 6B.

However, it is necessary to perform the operation for the number of elements of the operation matrix (for example, nine times for the 3×3 matrix) on all pixels read by the imaging apparatus in the low pass filter processing using the above-mentioned operation matrix. When there are a large number of pixels, the processing time of image processing becomes long.

The patent document 1 describes reducing the distance between a lens and a CCD image pickup element in a fingerprint image read device, and arranging the CCD image pickup element in a position shifted from the focal position of the lens, thereby removing the noise component of a fingerprint image.

The invention according to the patent document 1 dims high-frequency noise by blurring a fingerprint image to be read by a CCD image pickup element.

[Patent Document 1] Japanese Laid-open Patent Publication No. 2003-50991

SUMMARY OF THE INVENTION

The present invention aims at providing a desired filtering process on an image and thereby shortening the processing time of image processing by an imaging apparatus for reading information.

The imaging apparatus for reading information according to the present invention includes an iris for limiting the light-receptive range of the light from an object to be shot, a filter arranged at an aperture of the iris or near the aperture and having the transmittance varying with the position, a lens, and an image sensor. The distance between the above mentioned lens and the image sensor is adjusted so that the image forming position can be set in front of or backward the light-receptive surface of the image sensor, thereby spreading the light assigned a desired transmittance characteristic by the filter within a predetermined range.

By using the imaging apparatus for reading information described above, the processing time of image processing can be shortened, and a desired low pass filter process can be performed on an image.

BRIEF DESCRIPTION OF THE DRAWINGS

FIGS. 6A and 6B illustrate an operation matrix of a Gaussian filter and a moving average filter;

FIG. 7 illustrates a configuration of the imaging apparatus according to the first embodiment of the present invention;

FIG. 9 illustrates a configuration of the imaging apparatus according to the third embodiment of the present invention;

FIG. 12 is an example of the case where a density filter also functions as an iris;

FIG. 13 illustrates the power distribution of incident light on a target pixel and its peripheral pixels;

FIGS. 14A and 14B is an explanatory view of the operation according to an embodiment of the present invention;

FIGS. 16A and 16B illustrate the relationship between the transmittance characteristic of a density filter and the power distribution of light on an image sensor.

DESCRIPTION OF THE PREFERRED EMBODIMENTS

Figure 1:
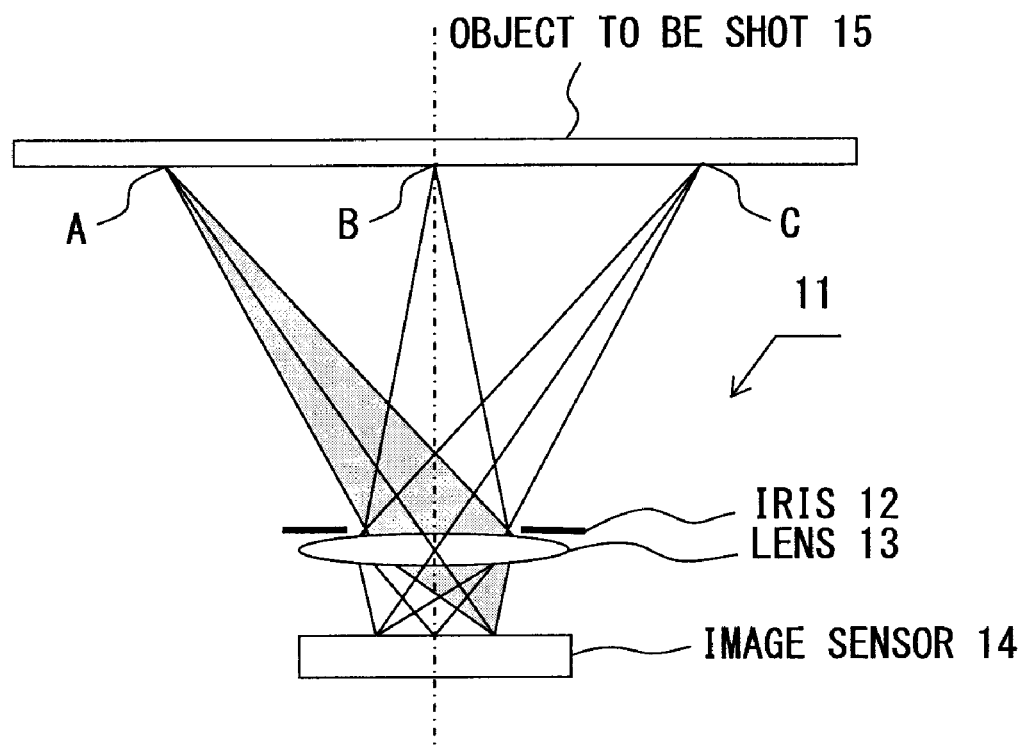
FIG. 1 illustrates a configuration of an imaging optical system.
Figure 2:
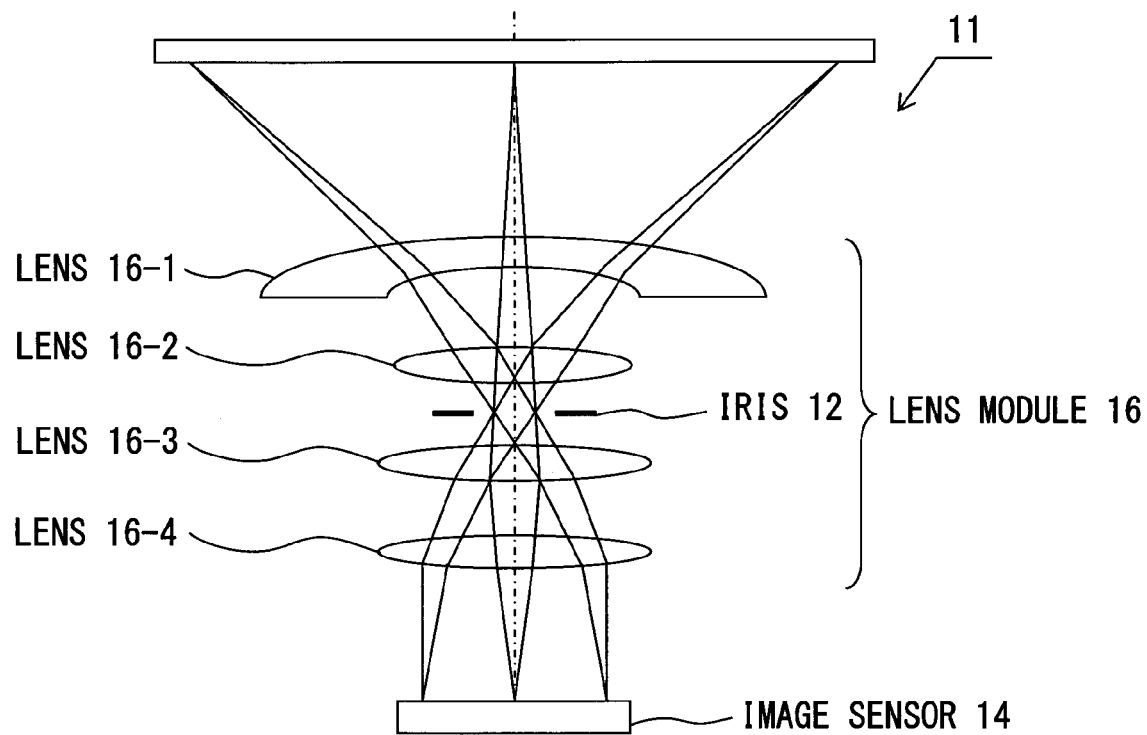
FIG. 2 illustrates another configuration of an imaging optical system.
Figure 3A:
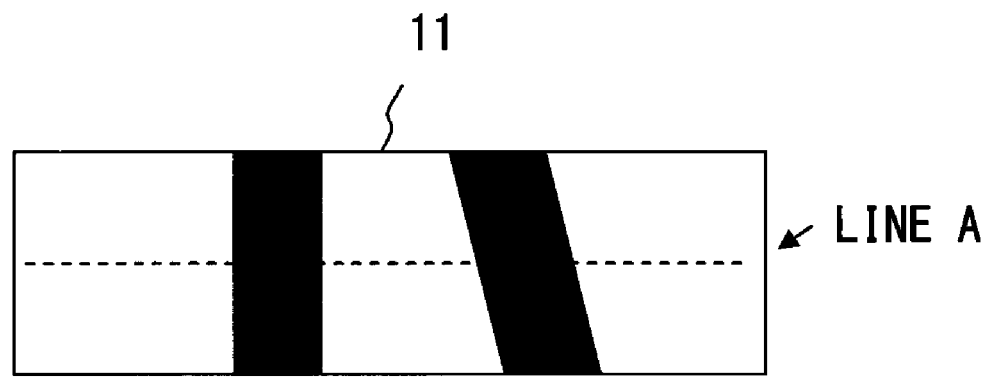
FIGS. 3A and 3B are examples of an object to be shot.
Figure 3B:
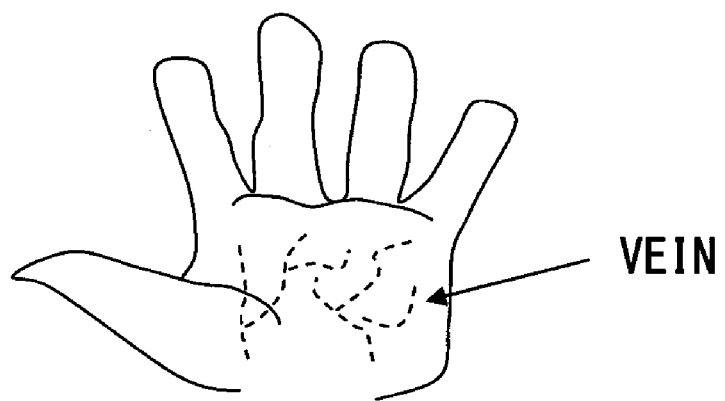
Figure 4A:
FIGS. 4A and 4B illustrate an image signal on which noise is superposed and an image signal after LPF processing.
Figure 4B:
Figure 5:
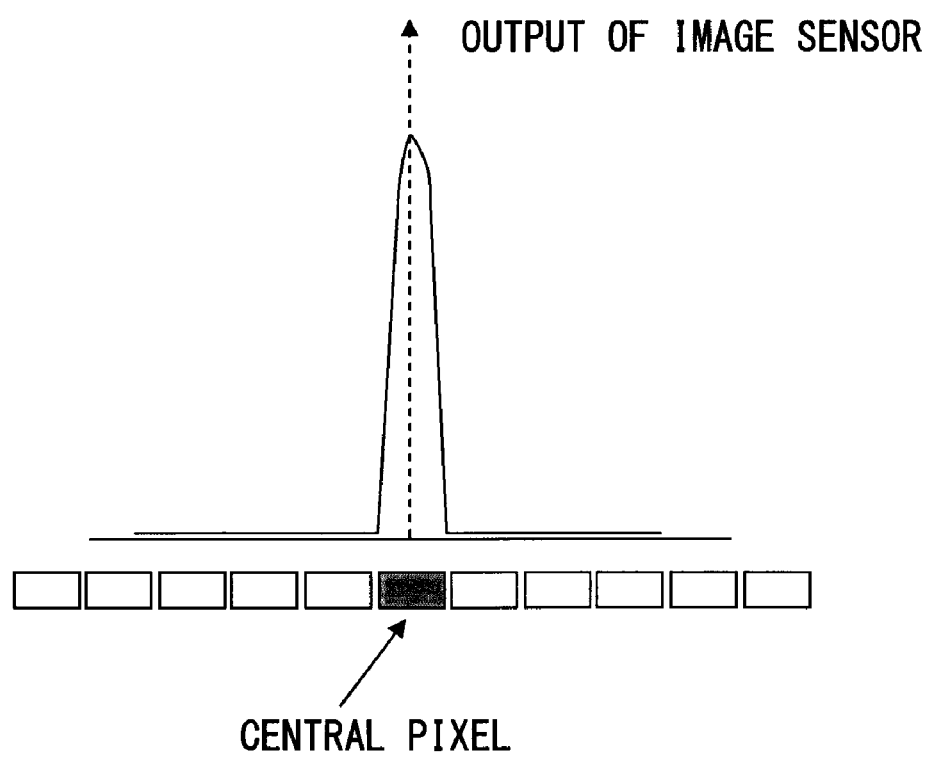
FIG. 5 illustrates the output of the image sensor of a conventional imaging apparatus.

The preferred embodiments of the present invention are described below. FIG. 7 illustrates a configuration of an imaging apparatus 21 for reading information according to the first embodiment of the present invention. The imaging apparatus 21 for reading information according to each embodiment of the present invention described below can be used in a bar code reader for reading a 1- or 2-dimensional bar code, a living body authentication device for reading a vein, etc.

The imaging apparatus 21 for reading information includes a density filter 22 functioning also as an iris, a lens 23, and an image sensor 24. The density filter 22 is arranged between the lens 23 and an object to be shot 25.

The density filter 22 is an optical filter element functioning as an iris unit 22a for limiting the acceptance angle of light at its periphery, and as a varying density filter unit 22b whose transmittance of light having an optical path limited by the iris unit 22a depends on the position at its central portion. An absorbing filter having a variable light absorptance, a reflecting filter having a variable reflectance, etc. can be used as the density filter 22 having a variable transmittance depending on the position on the plane perpendicular to the central axis of the filter and having desired transmittance characteristic (Gaussian distribution etc.).

In FIG. 7, the light from the object to be shot 25 enters the density filter 22 while spreading. The range of incident light to the lens 23 spreading from each point of the object to be shot 25 (referred to as a luminous flux) is limited by the iris unit 22a of the density filter 22. When the light whose optical path is limited by the iris unit 22a passes through the density filter unit 22b, the power of light continuously changes from the center to the periphery of the luminous flux. After the luminous flux forms an image on an image forming surface (image forming position) 26, it spreads toward the light-receptive surface of the image sensor 24 as an image spreading in a predetermined (certain) range on the light-receptive surface because the distance between the lens 23 and the image sensor 24 is adjusted so that the imaging surface 26 can be set in front of the light-receptive surface of the image sensor 24. Here, the image on the light-receptive surface of the image sensor 24 spreads over a plurality of pixels, for example, spreads three pixels in diameter.

This spread size of the image corresponds to the operational matrix size of the low pass filter, for example, the operation of a 3×3 Gaussian filter illustrated in FIG. 6A can be substituted by the above-mentioned light power distribution of 3 pixels in diameter. Here, 3 pixels in diameter can substitute for a 3×3 circular symmetric operation matrix, such as a Gaussian filter. However, in order to substitute for any kind of 3×3 operation matrix, including circular asymmetric matrix such as a moving average operation matrix, 4.5 pixels in diameter which is the circumscribed circle diameter is preferable. A combination of light spread to the circumscribed circle and a variable density filter can substitute for any kind of 3×3 operation matrix. In the same manner, when a large size LPF operation of 7×7 or 9×9 is substituted, the size of light power distribution is 7 or 9 pixels in diameter, and preferably 10 or 13 pixels in diameter which is the circumscribed circle diameter of the matrix of 7×7 or 9×9 respectively.

According to the above-mentioned first embodiment of the present invention, a desired transmittance characteristic is assigned by the density filter 22, and the light spreading on a light-receptive surface in a predetermined range enters the image sensor 24, thereby optically performing a low pass filter process on an image of the object to be shot 25. Therefore, since it is not necessary to perform an operation for the low pass filter process on the output signal of the image sensor 24, the processing time of the image processing can be shortened. In addition, any low pass filter process can be performed by changing the transmittance characteristic of the density filter 22. Furthermore, since the processing time for an image can be shortened, a less expensive CPU of a relatively low processing speed can be used for a bar code reader and a living body authentication device requiring a real-time process. Thus, the cost of the apparatus can be reduced.

Figure 8:
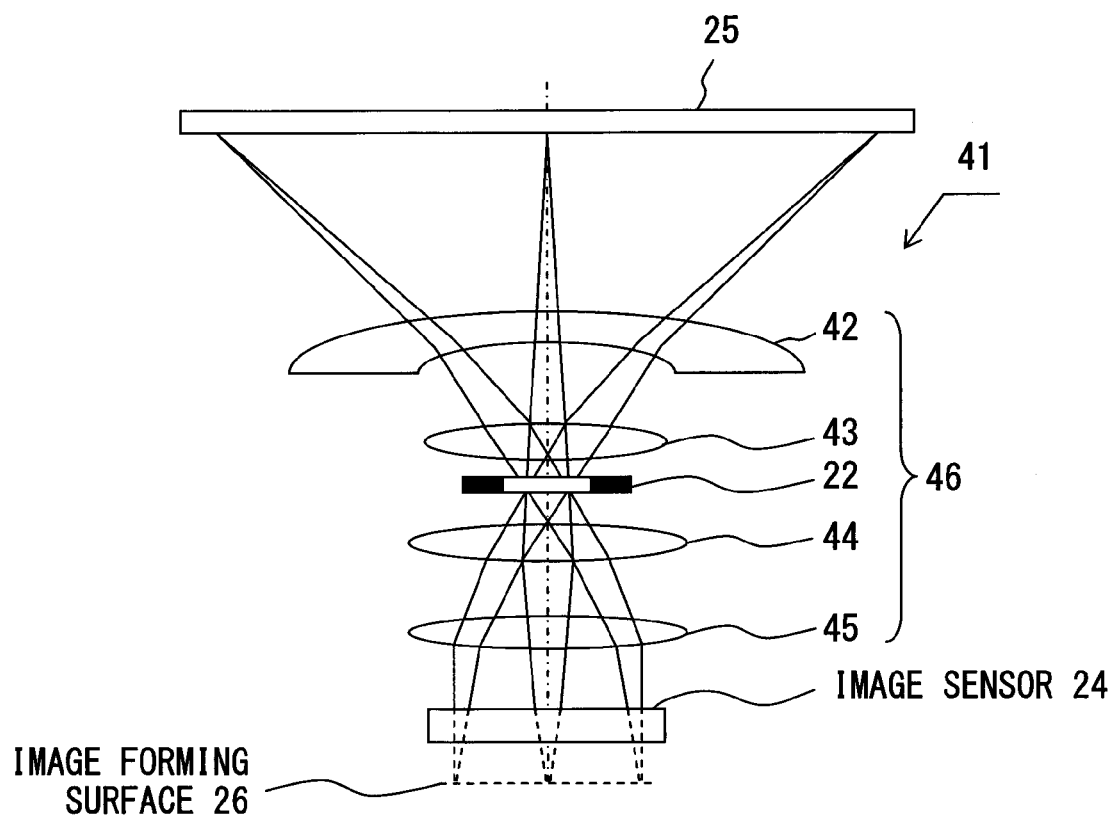
FIG. 8 illustrates a configuration of the imaging apparatus according to the second embodiment of the present invention.

FIG. 8 illustrates the configuration of an imaging apparatus 41 for reading information according to the second embodiment. The second embodiment is an example of the case where the image forming surface 26 is set backward the image sensor 24 in the image-side telecentric optical system in which the light from the lens to the image sensor 24 is parallel to the optical axis.

The optical system of the imaging apparatus 41 for reading information according to the second embodiment includes a lens module 46 configured by lenses 42, 43, 44, and 45 and the density filter 22.

The imaging apparatus 41 for reading information according to the second embodiment is similar to that according to the first embodiment except that the light incident on the image sensor 24 is parallel to the optical axis, and that the image forming surface 26 is behind the image sensor 24. Because of the image-side telecentric optical system, the image size does not vary when the distance between the lens and the image sensor changes for adjusting the spread size of the incident light on the image sensor surface. This means that the size of LPF can be adjusted independently from the image size and this is an advantage of the second embodiment.

In the imaging apparatus 41 for reading information according to the second embodiment, the reflected light at each point of the object to be shot 25 spreads on the light-receptive surface of the image sensor 24 in a predetermined range, and the power of incident light of each pixel of the image sensor 24 is limited by the transmittance characteristic of the density filter 22.

According to the second embodiment, a low pass filter process can be optically performed on the light incident from the object to be shot 25. Thus, since it is not necessary to perform a low pass filter operation on the image signal of the image sensor 24, the processing time of image processing can be shortened. In addition any low pass filter process can be optically realized by changing the transmittance characteristic of the density filter 22.

FIG. 9 illustrates a configuration of an imaging apparatus 51 for reading information according to the third embodiment of the present invention.

The third embodiment is basically identical with the second embodiment except that the image forming surface 26 is set in front of the image sensor 24.

Figure 10:
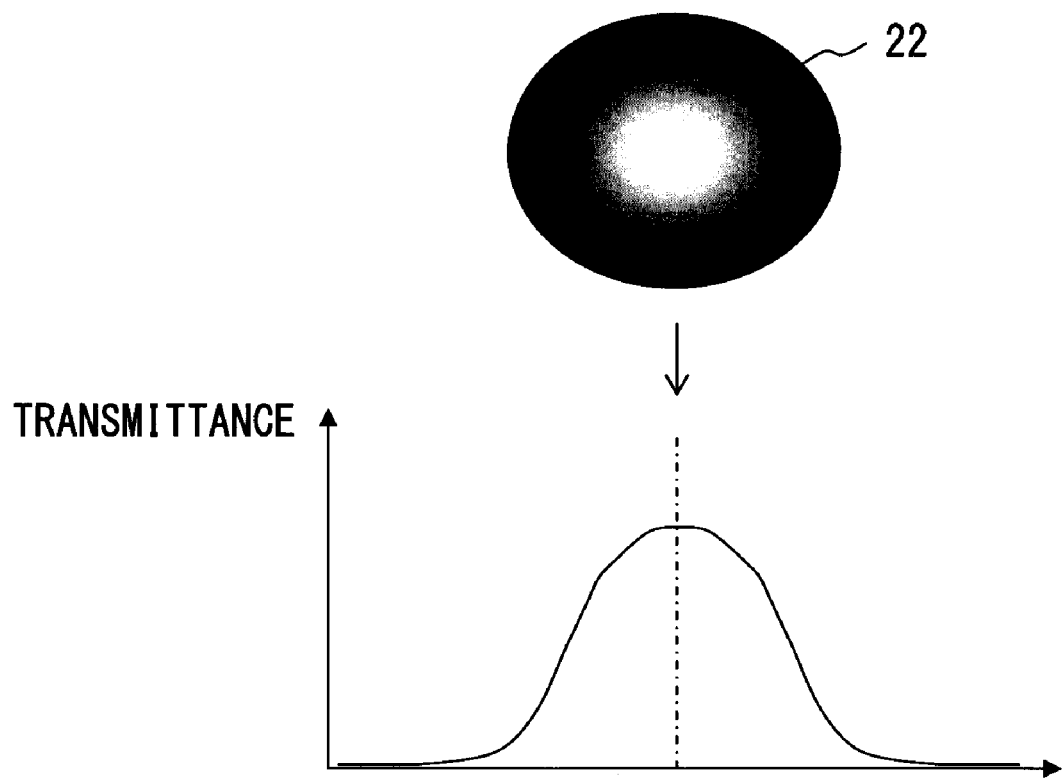
FIG. 10 illustrates the transmittance characteristic of the density filter.

FIG. 10 illustrates the transmittance characteristic of the density filter 22. The density filter 22 is a disk as illustrated in FIG. 10, indicates the highest transmittance at the center, and decreasing transmittance toward the periphery (for example, a Gaussian distribution). The periphery of the density filter 22 has the transmittance of 0, and functions as an iris.

Figure 11:
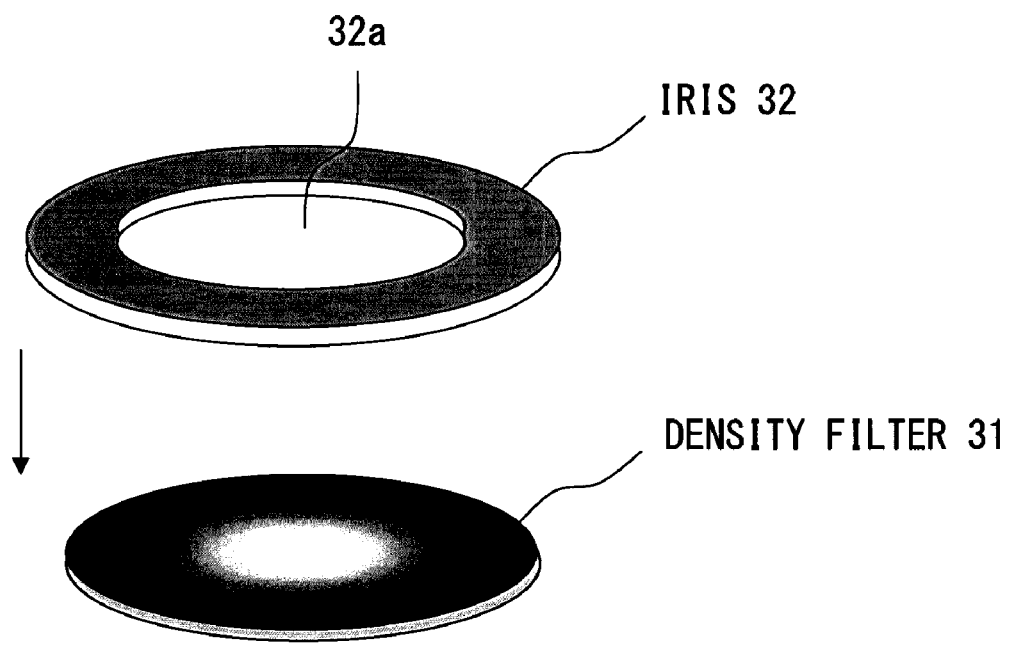
FIG. 11 is an example of the case where a density filter and an iris are separate components.

FIGS. 11 and 12 are other examples of a density filter. FIG. 11 is an example of the structure in which a separate density filter 31 is inserted into or attached to an iris 32 having an aperture 32a at the central portion of a non-translucent member of metal etc.

The density filter 31 is generated by, for example, coating a glass substrate with metal film (for example, chrome film etc.). When metal film is coated, the density filter 31 having any transmittance characteristic such as a Gaussian distribution etc. can be generated by making thinner film at the center and thicker metal film toward the periphery thereby decreasing the transmittance of the light.

When the iris 32 and the density filter 31 are separate components, the density filter 31 can be inserted into the aperture 32a of the iris 32, or arranged below the iris 32 near the aperture 32a.

FIG. 12 is an example of a density filter 33 also functioning as an iris. The function of an iris can be realized by setting the transmittance at the periphery of the density filter 33 to 0. For example, when metal film is coated, the periphery can function as an iris unit by thickening the metal film of the periphery and setting the optical transmittance to 0.

Described below is the light power distribution at each point of the image sensor 24 when the above-mentioned density filter 22 is used.

FIG. 13 illustrates the power of incident light of a target pixel a and its peripheral pixels. In the example in FIG. 7, the distance between the lens 23 and the image sensor 24 is adjusted to form an image before the light-receptive surface of the image sensor 24. Therefore, the luminous flux at the point A of the object to be shot 25 forms an image on the image forming surface 26, and then spreads in a predetermined range on the light-receptive surface of the image sensor 24.

For example, the light passing through the center of the luminous flux from the point A of the object to be shot 25 enters the point A' (refer to FIG. 7) of the image sensor 24. The light reflected at the point A of the object to be shot 25, passes the position at the right (viewed from the front illustrated in FIG. 7) of the density filter 22, and enters the point $A'_1$ at the left (viewed from the front illustrated in FIG. 7) of the point A' of the image sensor 24. The light that has passed the position at the left of the density filter 22 enters the point $A'_2$ at the right to the point A' of the image sensor 24.

The density filter 22 has the transmittance characteristic of the Gaussian distribution as illustrated in FIG. 10. Therefore, the light power distribution of the light reflected at the point A of the object to be shot 25, passing through the density filter 22, and entering the image sensor 24 is illustrated in FIG. 13, and the power of incident light of the target pixel a and its peripheral pixels a+1, a−1, a+2, and a−2 indicates the Gaussian distribution. It is the low pass filter process having the characteristic of the Gaussian distribution optically performed on the reflected light at the point A of the object to be shot 25.

The operations according to the first, second, and third embodiments are described below with reference to FIGS. 14A, 14B, and 15. Described below is an example of the case where the density filter 22 is arranged between the lenses in the optical system having a plurality of lenses, and an image is formed in front of the image sensor 24.

As illustrated in FIG. 14A, the light reflected at the point A of the object to be shot 25 enters the lenses 42 and 43 while spreading, and the optical path is limited by the iris unit 22a of the density filter 22. Since the density filter 22 has the transmittance characteristic as illustrated in FIG. 10, the light that has been reflected at the point A, and passed through the density filter 22 has the highest optical transmittance at the center of the luminous flux, and the decreasing transmittance toward the periphery. The light that has passed through the density filter 22 is converted into light parallel to the optical axis by the lenses 44 and 45, forms an image on the image forming surface 26, and spreads in a predetermined range (for example, a range having three or more pixels in diameter) on the light-receptive surface of the image sensor 24.

FIG. 14B illustrates the distribution of the power of incident light of each pixel of the image sensor 24. For example, the reflected light at the point A of the object to be shot 25 enters the corresponding pixel of the image sensor 24 and its peripheral pixels. The reflected light at the point A indicates the Gaussian distribution, that is, the power of incident light of the central pixel (target pixel a in FIG. 13) which the light at the center of the luminous flux enters is the largest, and the power of incident light decreases for a farther pixel from the central pixel.

The reflected light at the point next to the point A of the object to be shot 25 indicates the Gaussian distribution, in which the power of incident light of the pixel next to the point a (pixel a+1 in FIG. 13) on the image sensor 24 is the largest, and it decreases for a farther pixel from the central pixel. Similarly, the power of incident light of each of other pixels of the image sensor 24 indicates the Gaussian distribution as illustrated in FIG. 14B.

The light from the point A of the object to be shot 25 enters a corresponding pixel a of the image sensor 24 and a plurality of adjacent pixels a+1, a−1, a+2, a−2, . . . with the light power distribution depending on the transmittance characteristic of the density filter 22. Simultaneously, a part of the incident light centering on the pixel a+1, a−1, a+2, a−2, or other adjacent pixels also enters the pixel a. Thus, an optical convolution is performed. It means that the conventional process of the low pass filter operation performed by the convolutional operation on the output signal of the image sensor 24 is optically replaced.

Figure 15:
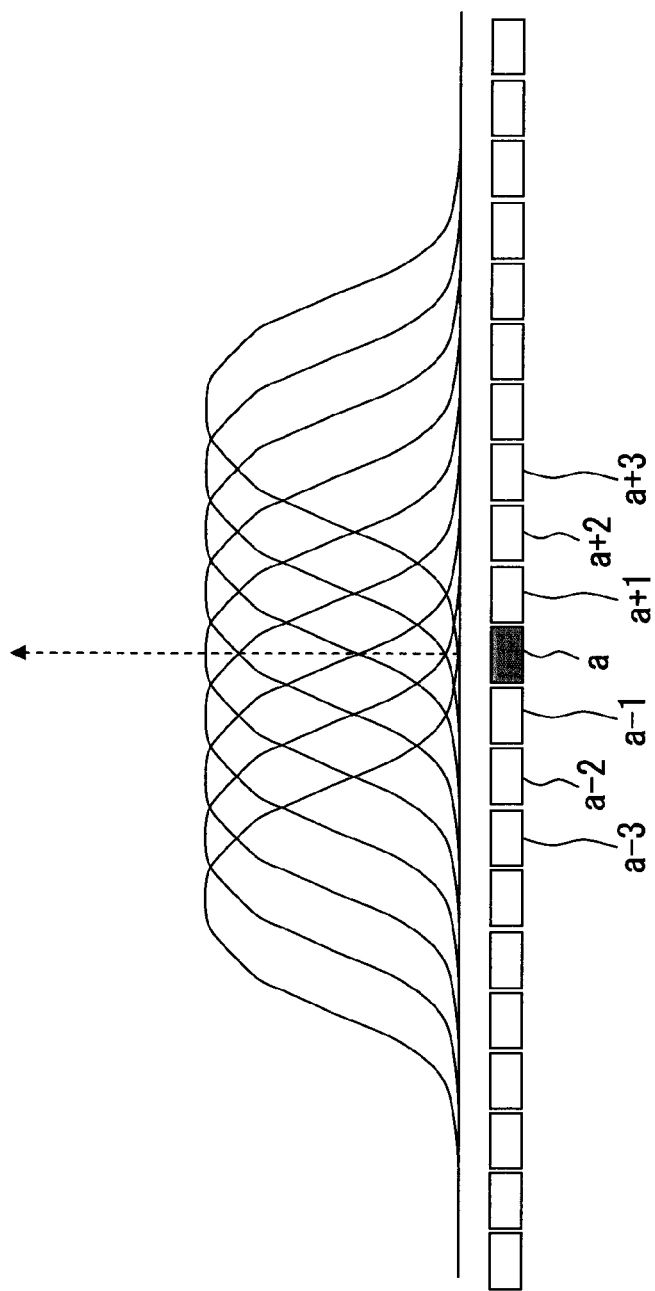
FIG. 15 illustrates the power distribution of incident light on a pixel array of an image sensor.

FIG. 15 illustrates the power of incident light at an arbitrary pixel array of the image sensor 24.

As described above, the light (luminous flux) from the point A of the object to be shot 25 enters the density filter 22 while spreading, but the incident light is limited by the iris unit 22a, and the luminous flux passing through the density filter unit 22b indicates continuously decreasing transmittance from the center of the luminous flux toward the periphery according to the transmittance characteristic of the density filter 22. The luminous flux temporarily forms an image, but spreads in a predetermined range (for example, a range of a diameter of a length of three pixels from the center of the luminous flux) when it enters the image sensor 24.

Therefore, the luminous flux that is reflected at each point of the object to be shot 25, passes through the density filter 22, and enters the image sensor 24 has a predetermined light power distribution centering on the target pixel on which the central light of the luminous flux enters. For example, the light reflected at the point A of the object to be shot 25 has the power distribution which indicates the Gaussian distribution illustrated in FIG. 10 centering on the pixel a. In addition, the light having the adjacent pixels a+1, a−1, a+2, a−2, . . . as the center also enters the pixel a, thereby optically performing a convolutional operation.

As described above, since the power of the reflected light at each point of the object to be shot 25 is limited by the transmittance characteristic of the density filter 22 and enters the 24, for example, when the density filter 22 has the characteristic of the Gaussian distribution, a low pass filter process having the Gaussian distribution can be performed on the light incident on the image sensor 24.

According to the above-mentioned imaging apparatuses 21, 41, and 51 for reading information, a low pass filter process can be optically performed on the light incident from the object to be shot 25. Thus, it is not necessary to perform a low pass filter operation on the image signal of the image sensor 24, thereby shortening the processing time of image processing.

In the description above, the transmittance distribution of the density filter 22 is defined as a Gaussian distribution, and the light power distribution of the point image on the image sensor 24 obtained as a result is also defined as a Gaussian distribution for simple explanation. However, since the basic optical system itself commonly has not a flat power distribution but a specific light power distribution, the two distributions do not necessarily match. Therefore, to correctly define the light power distribution on the image sensor 24 as a Gaussian distribution, it is necessary to adjust in advance the transmittance distribution of the density filter 22 to offset the distribution specific to the basic optical system. The process is described below in detail with reference to FIGS. 16A and 16B.

FIGS. 16A and 16B illustrate the relationships between the transmittance characteristic of the density filter 22 and the power of received light of the image sensor 24 when there is and is not a density filter at the aperture of the iris.

FIG. 16A illustrates the radius direction of the density filter 22, and FIG. 16B illustrates the relationship between the distance r in the radius direction from the center of the density filter 22 and the transmittance, and the relationship between the distance from the center of the target pixel (point A' in FIG. 7) of the image sensor 24 and the power of light. The horizontal axis in FIG. 16B indicates the distance from the center of the density filter 22 and the distance from the center of the target pixel while the vertical axis indicates the transmittance and the power of light.

The graph of the solid line in FIG. 16B indicates the transmittance of the density filter 22, and the graphs of the dotted line indicate the light power distributions on the image sensor 24 with and without a density filter.

The light power distribution at the point A' (without a density filter) indicated by the dotted line in FIG. 16B is the light power distribution on the image sensor 24 when the density filter 22 is not used while the image is out of focus with the image forming surface 26 of the lens 23 shifted before or backward the light-receptive surface of the image sensor 24. In this case, since the density filter 22 is not used, the light power distribution of the pixels in the predetermined range centering on the target pixel (pixel at the point A') is trapezoidal, but it is not completely trapezoidal because a lens or a lens module generally can collect less power of light at the periphery than the central portion of the captured image, and the light power distribution indicates a decreasing power of light with a larger r as indicated by the dotted line (the low pass filter effect can be obtained as is, but is limited by a low pass filter having a specific characteristic).

The light power distribution at the point A' (with a density filter) indicated by the dotted line in FIG. 16B is the light power distribution of the image sensor 24 when the density filter 22 is used while the image is out of focus with the image forming surface 26 of the lens 23 shifted before or backward the light-receptive surface of the image sensor 24. In this case, the light power distribution of the pixels in a predetermined range centering on the target pixel (pixel at the point A') is a combination of the transmittance characteristic of the density filter 22 and the light power distribution without a density filter.

Therefore, to correctly define as a Gaussian distribution the light power distribution on the image sensor 24 obtained as a result, the transmittance distribution of the density filter indicated by the solid line is not defined as a Gaussian distribution, but the light power distribution without a density filter, that is, the light power distribution specific to the basic optical system is to be offset.

In addition, by changing the transmittance characteristic of the density filter 22, any low pass filter process other than the Gaussian distribution can be optically performed on the light incident on the image sensor 24.

In the above-mentioned embodiment, the processing time of image processing can be shortened in the imaging apparatus for reading information, and a desired low pass filter process can be optically performed on an image. In addition, since a less expensive CPU of a relatively low processing speed can be used for an imaging apparatus for reading information that has to perform a real-time process by shortening the processing time of image processing, the cost of the imaging apparatus for reading information can be reduced.

Although the low pass filter process with a Gaussian distribution characteristic is performed on an image by the density filter 22 in the embodiments above, the present invention can also be applied to a case where a low pass filter characteristic other than the Gaussian distribution is used.

The present invention can also be applied to an optical system configured by a plurality of lenses other than an image-side telecentric optical system.

What is claimed is:

1. An imaging apparatus for reading information, comprising:

an iris for limiting the light-receptive range of the light from an object to be shot; a density filter arranged at an aperture of the iris or near the aperture and having the varying transmittance with the position; a lens; and an image sensor, wherein a distance between the lens and the image sensor is adjusted so that an image forming position of the lens can be set in front of or backward a light-receptive surface of the image sensor, thereby causing light from one point of the object to be shot to enter a plurality of pixels adjacent to a corresponding pixel of the image sensor with a light power distribution depending on a transmittance characteristic of the filter and causing light entering and centering on the plurality of pixels to partly enter the corresponding pixel of the image sensor spreading; wherein the distance between the lens and the image sensor is adjusted so that spread of an image on the light-receptive surface of the image sensor can be a length of three pixels or more in diameter when the image forming position is set in front or backward the light-receptive surface of the image sensor.

2. The apparatus according to claim 1, wherein the transmittance characteristic has a Gaussian distribution.

3. The apparatus according to claim 1, wherein the filter is arranged between the object to be shot and the lens.

4. The apparatus according to claim 1, wherein the filter is formed as unitary construction with the iris.

5. The apparatus according to claim 1, wherein the lens is an optical system configured by a plurality of lenses, and the filter is arranged among the plurality of lenses.

* * * * *